(12) United States Patent
Kim

(10) Patent No.: US 11,349,929 B2
(45) Date of Patent: May 31, 2022

(54) SERVICE REQUEST INFORMATION TRANSFER SYSTEM AND METHOD

(71) Applicant: HELLOFACTORY CO., LTD., Seoul (KR)

(72) Inventor: Kyungmin Kim, Seoul (KR)

(73) Assignee: HELLOFACTORY CO., LTD., Seoul (KR)

( * ) Notice: Subject to any disclaimer, the term of this patent is extended or adjusted under 35 U.S.C. 154(b) by 0 days.

(21) Appl. No.: 17/315,200

(22) Filed: May 7, 2021

(65) Prior Publication Data

US 2021/0266365 A1  Aug. 26, 2021

Related U.S. Application Data

(63) Continuation of application No. 16/689,049, filed on Nov. 19, 2019, now Pat. No. 11,005,943.

(30) Foreign Application Priority Data

Jul. 26, 2019 (KR) .................. 10-2019-0090690
Jul. 26, 2019 (KR) .................. 10-2019-0090691
(Continued)

(51) Int. Cl.
*G06F 17/00* (2019.01)
*H04L 67/125* (2022.01)
(Continued)

(52) U.S. Cl.
CPC ....... *H04L 67/125* (2013.01); *G06Q 30/0635* (2013.01); *G06Q 50/12* (2013.01); *G08B 21/0469* (2013.01)

(58) Field of Classification Search
CPC .. H04L 67/125; G06Q 30/0635; G06Q 50/12; G08B 21/0469
(Continued)

(56) References Cited

U.S. PATENT DOCUMENTS 10,812,596 B2 * 10/2020 Warrick ................ H04W 12/63
2010/0076854 A1    3/2010 Martucci et al.
(Continued)

OTHER PUBLICATIONS

Notice of Allowance dated Jan. 11, 2021 for U.S. Appl. No. 16/689,049 (now published as 2021/0029200).
(Continued)

*Primary Examiner* — Ahshik Kim
(74) *Attorney, Agent, or Firm* — Ladas & Parry, LLP

(57) ABSTRACT

A service request information transfer system includes: a service request taking/management terminal managed by a service desk, that receives a room service request from a customer, matches the serial number of a customer terminal provided to the customer with the order number and room number of the customer, identifies the staff member closest to the location of the room from which the room service request is received, upon receiving the room service request, and provides order information to a staff terminal the closest staff member is carrying; a customer terminal that is provided to a customer and sends the serial number of the device as a short-range wireless communication signal when the customer makes a call; a cloud service server that receives a room number and the serial number of a customer terminal matching the room number from the service request taking/management terminal and stores the same, finds the room number matching the serial number upon receiving the serial number of the customer terminal, creates a room service message corresponding to the room number and sends the same to the staff terminal of the staff member closest to the room with the room number; and a staff terminal that receives a room number and a room service message from the cloud service server and displays the same so that a corresponding room service staff member acknowledges information about the room service request and provides room service.

10 Claims, 6 Drawing Sheets

(30) Foreign Application Priority Data

Jul. 26, 2019 (KR) .......................... 10-2019-0090693
Jul. 26, 2019 (KR) .......................... 10-2019-0090694

(51) Int. Cl.
*G08B 21/04* (2006.01)
*G06Q 50/12* (2012.01)
*G06Q 30/06* (2012.01)

(58) Field of Classification Search
USPC ........................................................ 235/375
See application file for complete search history.

(56) References Cited

U.S. PATENT DOCUMENTS

| | | |
|---|---|---|
| 2016/0365986 A1 | 12/2016 | Song et al. |
| 2017/0061442 A1* | 3/2017 | Barlow ................ G06Q 30/016 |
| 2018/0103074 A1 | 4/2018 | Rosenberg |
| 2018/0160269 A1* | 6/2018 | Baarman ................ H04W 4/80 |
| 2020/0042925 A1 | 2/2020 | Ramani et al. |
| 2021/0029200 A1 | 1/2021 | Kim |

OTHER PUBLICATIONS

Office Action dated Jul. 23, 2020 for U.S. Appl. No. 16/689,049 (now published as 2021/0029200).

\* cited by examiner

| Wi-FI AP and location matching table | | |
|---|---|---|
| WI-Fi MAC | Location | Location-specific No. |
| aa:bb:cc:00:11:22 | Section A, First floor | 1-A |
| aa:bb:cc:00:11:33 | Section B, First floor | 1-B |
| aa:bb:cc:00:11:44 | Section C, First floor | 1-C |
| aa:bb:cc:00:22:00 | Elevator A | E-A |
| ... | | ... |

FIG. 2

Table showing the movements of the staff

| Staff member-specific No. | Time | Location number | Received signal strength |
|---|---|---|---|
| 001 | 2019.07.05. 13:22:44 | 1-A | -55 |
| 001 | 2019.07.05. 13:23:15 | 1-A | -45 |
| 001 | 2019.07.05. 13:24:00 | E-A | -30 |
| 001 | 2019.07.05. 13:24:30 | 3-A | -46 |
| 001 | 2019.07.05. 13:25:15 | 3-A | -57 |
| 001 | 2019.07.05. 13:26:54 | 3-B | -50 |
| 001 | 2019.07.05. 13:27:32 | 3-C | -61 |

FIG. 3

| Serial No. of staff terminal | Location-specific No. | Staff's task status |
|---|---|---|
| 001 | 1-A | Rejected the message from Room 104 |
| 002 | 2-A | Completed the request from Room 208 |
| 003 | E-A | Working on an elevator in Section A |
| 004 | 3-C | - |
| 005 | 1-A | Accepted the message from Room 104 |
| 006 | 3-B | Processing the request from Room 302 |

Current locations of the staff and the staff's task status

FIG. 4

SERVICE REQUEST INFORMATION TRANSFER SYSTEM AND METHOD

CROSS-REFERENCE TO RELATED APPLICATIONS

This application is a continuation of U.S. patent application Ser. No. 16/689,049 filed on Nov. 19, 2019, which claims the priority to Korean Patent Application No. 10-2019-0090690 filed in the Korean Intellectual Property Office on Jul. 26, 2019, Korean Patent Application No. 10-2019-0090691 filed in the Korean Intellectual Property Office on Jul. 26, 2019, Korean Patent Application No. 10-2019-0090693 filed in the Korean Intellectual Property Office on Jul. 26, 2019, and Korean Patent Application No. 10-2019-0090694 filed in the Korean Intellectual Property Office on Jul. 26, 2019, the entire contents of which are incorporated herein by reference.

BACKGROUND OF THE INVENTION

Field of the Invention

The present invention relates to a service request information transfer system and method, and more particularly, to a service request information transfer system and method that provide a customer terminal when providing service to a customer in a large store and allow the customer to call through the customer terminal so that the call is transferred directly to the staff member closest to where the call information is generated.

Moreover, the present invention relates to a service request information transfer system and method that allow the staff member closest to where the call information is generated to share the call information with the second closest staff member if the closest staff member is processing a customer's request or cannot accept the call because they are busy working on what they are doing.

In addition, the present invention relates to a service request information transfer system and method that allow a staff member having an urgent situation to share the urgency of the situation with the staff member closest to where the urgent situation has happened.

Related Art

A call bell is often used in restaurants, sports arenas, shopping malls, hotels, and other such places to summon a staff member or manager or ask for service.

However, with such a call bell system, it takes a lot of time to handle a call from a customer if the staff or manager is far away from where the customer is located, and, if a number of staff members come to a customer who has made a call, they won't be able to work on other things they need to do. Also, even if a customer's request is in process or is completed, other staff members who are not aware of this are highly likely to process the same request, which makes the conventional call system impractical.

Besides, a staff member or manager handling a service issue may get into an urgent situation, but the absence of an automatic urgency detection system makes staff management difficult.

SUMMARY OF THE INVENTION

The present invention provides a service request information transfer system and method which, when a customer asks for room service, get the staff member closest to the customer's room to take the customer's request quickly and offer room service to them, and, if a certain staff member is delivering a customer's request or has completed it, update the status information to prevent other staff members from processing the same customer request.

The present invention also provides a service request information transfer system and method which, if a staff member is in an urgent situation, inform other staff members of the urgency of the situation to ask for help.

In an aspect, a service request information transfer system is provided. The service request information transfer system may include: a service request taking/management terminal managed by a service desk, that receives a room service request from a customer, matches the serial number of a customer terminal provided to the customer with the order number and room number of the customer, identifies the staff member closest to the location of the room from which the room service request is received, upon receiving the room service request, and provides order information to a staff terminal the closest staff member is carrying; a customer terminal that is provided to a customer and sends the serial number of the device as a short-range wireless communication signal when the customer makes a call; a cloud service server that receives a room number and the serial number of a customer terminal matching the room number from the service request taking/management terminal and stores the same, finds the room number matching the serial number upon receiving the serial number of the customer terminal, creates a room service message corresponding to the room number and sends the same to the staff terminal of the staff member closest to the room with the room number; and a staff terminal that receives a room number and a room service message from the cloud service server and displays the same so that a corresponding room service staff member acknowledges information about the room service request and provides room service.

In another aspect, a service request information transfer method is provided, in which a customer terminal, a staff terminal, and a service request taking/management terminal are connected to a cloud service server to send and receive data. The service request information transfer method may include: upon receiving a room service request from the customer terminal, identifying, by the service request taking/management terminal, the staff member closest to the location of the room from which the room service request is received; sending a room service message, by the service request taking/management terminal, to the staff terminal of the staff member closest to the location of the room from which the room service request is received; checking, by the service request taking/management terminal, whether the staff member has accepted the message or not after receiving the same; if the staff member has rejected the room service message, repeatedly identifying another recipient and sending the room service message to the staff terminal of the another recipient; and if the message is accepted, updating the status information of the staff terminal and ending the message transfer.

BRIEF DESCRIPTION OF THE DRAWINGS

FIGS. 2 through 5 are views for explaining a method for transferring request information in a request information transfer system according to an exemplary embodiment of the present invention.

DESCRIPTION OF EXEMPLARY EMBODIMENTS

Hereinafter, exemplary embodiments of the present invention will be described in details with reference to the accompanying drawings. The detailed description to be disclosed herein along with the accompanying drawings is provided to describe exemplary embodiments of the present invention and is not intended to describe a sole embodiment in which the present invention may be implemented.

However, these embodiments are provided to fully convey the scope of the invention to those skilled in the art, and the present invention is defined only by the appended claims.

In some cases, well-known structures and devices may be omitted or block diagrams illustrating only key functions of the structures and devices may be provided, so as not to obscure the concept of the present invention. That is, configurations for accessing the internet, types of short-range wireless communication signals, and configurations for accessing the internet via a short-range communication relay or short-range communication terminal will be omitted.

In the entire specification, when a certain portion "comprises or includes" a certain component, this indicates that the other components are not excluded and may be further included unless specially described otherwise.

Specific terms used in the embodiments of the present invention are provided to assist understanding of the present invention, and, unless defined otherwise, all terms used herein including technical or scientific terms have the same meaning as those generally understood by the person with ordinary skill in the art to which the present invention pertains. Various modifications may be made in the specific terms within the range that they do not depart from technical spirits of the present invention.

Hereinafter, exemplary embodiments of the present invention will be described in details with reference to the accompanying drawings. The detailed description to be disclosed herein along with the accompanying drawings is provided to describe exemplary embodiments of the present invention and is not intended to describe a sole embodiment in which the present invention may be implemented.

Figure 1:
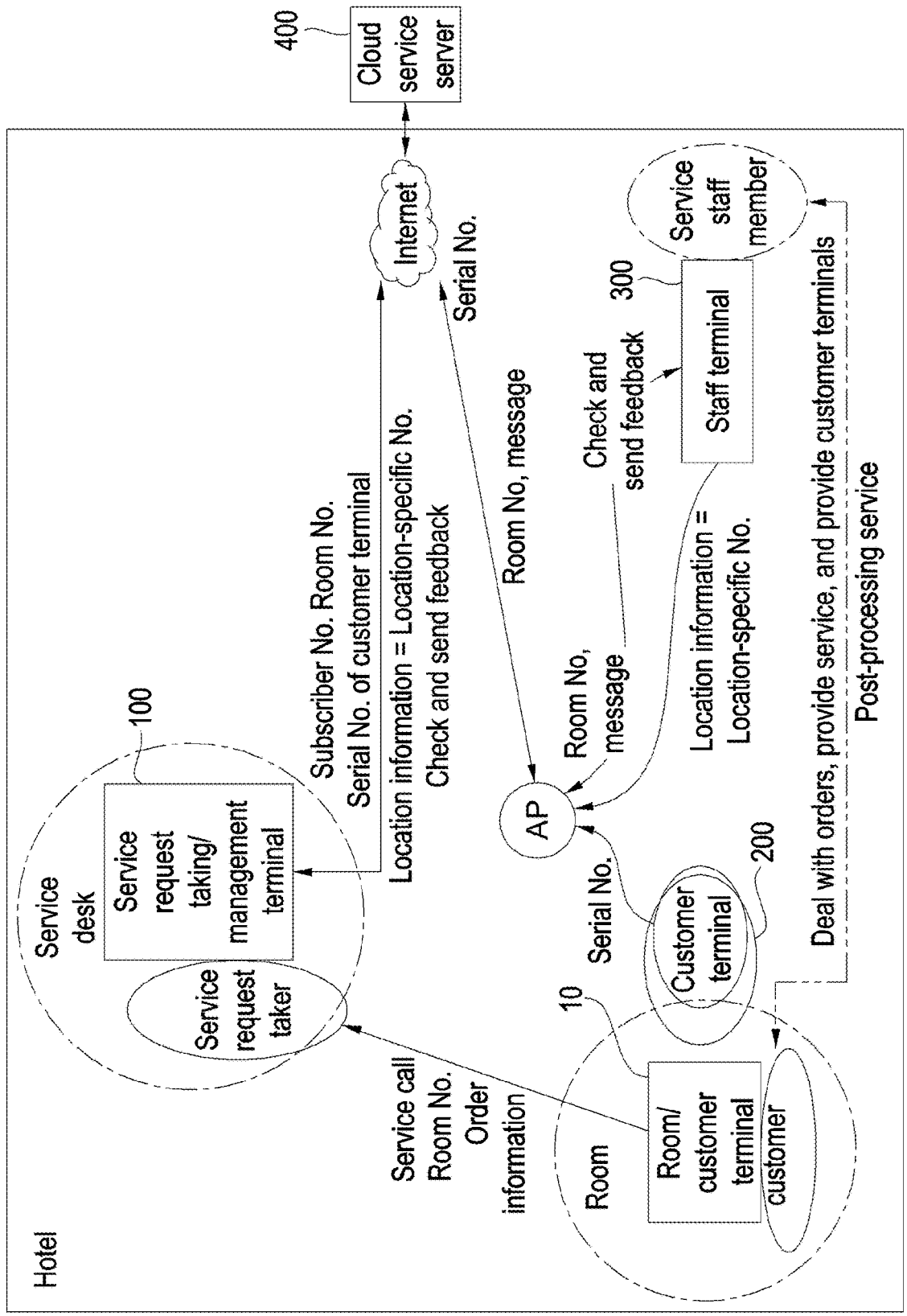
FIG. 1 is a diagram showing the configuration of a service request information transfer system according to an exemplary embodiment of the present invention.

FIG. 1 is a diagram showing the configuration of a service request information transfer system according to an exemplary embodiment of the present invention. The service request information transfer system according to the present invention will be described with respect to, but not limited to, hotel room service.

The service request information transfer system includes a service request taking/management terminal 100, a customer terminal 200 that is provided to a customer and sends the serial number of the device as a short-range wireless communication signal by pressing a button, a cloud service server 400 that is accessed by the service request taking/management terminal 100 and customer terminal 200 via a wireless internet communication means, and a staff terminal 300 that is carried around by a room service staff member and can access the cloud service server 400 via the internet.

The service request taking/management terminal 100 may be configured by installing programs and applications capable of implementing functions of the present invention on a PC that can access the internet and allows for short-range wireless communication.

The service request taking/management terminal 100 is able to accept and manage room service requests by accepting a room service request from a customer, creating a room service order number, and inputting room service request information, i.e., order information, into the order number. In the present invention, the service request taking/management terminal 100 stores a room number and order information by matching them with the order number, stores the serial number of the customer terminal 200 by matching it with the order number and the room number, and sends the matching information to the cloud service server 400.

As a method of matching the serial number of the customer terminal 200, a service request taker may manually store a customer terminal's number by matching it with an order number and a room number, and, when the serial number is wirelessly sent by pressing the send button of the customer terminal 200, the wirelessly sent serial number is received and automatically matched. To this end, an applicable capable of receiving a wireless signal from the customer terminal and automatically matching it with the order number and the room number may be installed on the corresponding service request taking/management terminal 100.

Moreover, the service request taking/management terminal 100 may manage the staff efficiently by receiving information about the current locations of staff members in real time by locating them using wireless routers installed in the hotel.

To this end, first of all, the service request taking/management terminal 100 collects MAC addresses, signal strengths, etc., which are Wi-Fi AP information of a number of wireless routers installed in the hotel, stores the collected MAC addresses as Wi-Fi AP location information, with identification information including location-specific numbers inputted to it, and sends this information to the cloud service server 400. Afterwards, if a staff member is located near any Wi-Fi AP included in the stored Wi-Fi AP location information, the service request taking/management terminal 100 calculates the current location of the staff member by putting together the strength of the Wi-Fi AP near the staff terminal 300 the staff member is carrying and storing it as a location-specific number. In this case, the service request taker may manually store the MAC addresses, signal strengths, and Wi-Fi AP location information, which are the Wi-Fi AP information of the wireless routers, in the service request taking/management terminal 100, or the information may be received from the cloud service server 400 and managed through automation.

For example, if a MAC address included in the Wi-Fi AP information is aa:bb:cc:00:11:22, the Wi-Fi AP location information may be set as Section A, Floor 1, which may be matched with a preset location-specific number 1-A. Also, if a Wi-Fi MAC address is aa:bb:cc:00:22:00, the Wi-Fi AP location information may be set as Elevator A, which may be matched with location-specific number E-A. If the staff terminal 300 with serial No. 24 has the highest measured Wi-Fi AP signal strength at location-specific number E-A, the service request taking/management terminal 100 may find out that the staff member carrying the staff terminal 300 with serial No. 24 is located at Elevator A. If the staff terminal 300 with serial No. 5 has the highest measured Wi-Fi AP signal strength at location-specific number 1-A, the service request taking/management terminal 100 may find out that the staff member carrying the staff terminal 300 with serial No. 5 is located at Section A, Floor 1. Based on information about the current locations of the staff, upon receiving order information from the customer terminal 300, the service request taking/management terminal 100 may automatically locate the staff member closet to the room with the room number from which the order information is received and send a room service message to the staff terminal 300 the staff member is carrying.

While, in the present invention, the service request taking/management terminal 100 sends a room service message first to the staff terminal 300 of the staff member located closest to the room with the room number from which the order information is received, it may re-send the room-service message to the staff terminal 300 of the second closest staff member depending on the design if the closest staff member does not accept the room service message.

Moreover, if the staff terminal 300 is a smart device capable of detecting an abnormal biological signal, danger, etc., the service request taking/management terminal 100 may detect any abnormal biological signal, danger, etc. from the staff member carrying the staff terminal 300, create an urgent message, and send it to other staff terminals 300.

This process will be described in details when describing the staff terminal 300 later.

The service request taking/management server 100 stores an order number and a room number as matching information by matching them with the serial number of the customer terminal 200, and stores Wi-Fi AP information and Wi-Fi AP location information and sends them to the cloud service server 400.

The cloud service server 400 is accessed by the service request taking/management terminal 100 via the internet. The cloud service server 400 may provide call information transfer service to a number of stores, i.e., hotels. That is, when the service request taking/management terminal 100 sends the corresponding subscriber number when accessing the cloud service server 400, the cloud service server 400 may identify the subscriber (i.e., hotel) and control the information transfer service for this hotel.

The cloud service server 400 may send and receive information by connecting to the customer terminal 200 and the staff terminal 300 over the wireless internet. Since the customer terminal 200 is a wireless transmitter that only sends the serial number, it requires an internet communication means to connect to the cloud service server 400. Also, the customer terminal 200 may be set up to pair with an AP for short-range wireless communication, and the AP may receive a wireless signal from the customer terminal 200 and send the serial number to the cloud service server 400 over the internet. If the staff terminal 300 is a mobile phone or smart watch, it may receive data directly from the cloud service server 400, whereas, if the staff terminal 300 is a short-range wireless communication terminal only equipped with a display function, it may be set up to pair with an AP for short-range wireless communication like the above customer terminal and communicate with the cloud service server 400.

The cloud service server 400 receives a room number and the serial number of a customer terminal that matches the room number from the service request taking/management terminal 100 and stores them as matching table information. Afterwards, upon receiving the serial number of the customer terminal 200, the cloud service server 400 finds the room number matching the serial number, creates a room service message corresponding to the matching room number and sends it to the staff terminal 300.

Moreover, the cloud service server 400 receives Wi-Fi AP information of wireless routers installed in the hotel and Wi-Fi AP location information from the service request taking/management terminal 100, receives information about the current location of each staff member, which is calculated by putting together the strengths of Wi-Fi APs near the staff terminal 300 each staff member is carrying, and stores this information as location-specific information, i.e., location matching table information. Afterwards, when a room service message is created from the customer terminal 200, the cloud service server 400 sends the room service message to the staff terminal 300 carried by the staff member closest to the room with the room number.

The staff terminal 300 receives a room number and a room service message from the cloud service server 400 and displays them so that a corresponding room service staff member acknowledges information about the room service request and provide room service. The staff terminal 300 may be a smart watch or mobile terminal a service staff member is carrying around with them or a PC or table device that displays and manages the status of all room service.

Furthermore, in the present invention, a separate interface with buttons for sending a status message like "message accepted", "message rejected", "service in process", and "service completed" may be configured on a terminal in order to allow a staff member to control room service messages. For example, when a staff terminal 300 receives a room service request, the staff member may click an "accept" or "reject" button. If the staff member has clicked the accept button and is processing the room service request or has completed it, the staff member carrying the staff terminal 300 may click an "in-process" button or "completed" button regarding a room service message displayed on the screen of the terminal. If a staff member receives the room service message but clicks the message reject button because they are not able to process the request or is busy working on what they are doing, the room service message may be handed over to other staff members under control of the service request taking/management terminal 100. Once the room service message is handed over from the staff terminal 300, the control value may be sent to the service request taking/management terminal 100 through the cloud service server 400. The service request taking/management terminal 100 may then update the status information of the room service request and send it to every staff terminal 300 through the cloud service server 400 to display the status information of every staff terminal 300.

Every staff member carrying their own staff terminal 300 is able to know how the room service request from the corresponding room number is being processed, and if a certain staff member is processing the room service request or has completed it, the other staff members may check on this and keep working efficiently on what they are doing without processing the same request.

If the staff terminal 300 is a smart device capable of detecting an abnormal biological signal, danger, etc. depending on the design, it may create and send an urgent message to other staff terminals 300. For example, if a biological signal from a staff member carrying a staff terminal 300 with serial No. 7 is beyond a certain reference level, an abnormal signal message may be sent to the terminal 300 of that staff member. If this staff member has not read the message for more than a certain amount of time, an urgent message may be created and sent to the staff terminal 300 of the staff member closest to the staff terminal 300 with serial No. 7 or to the staff terminals 300 of all staff members. Also, when the urgent situation is over, the staff member carrying the staff terminal 300 with serial No. 7 or any staff member who has received the urgent message may send an "urgent situation over" message through their own staff terminal 300.

The abnormal signal message, urgent message, and urgent situation over message may be created from data stored in the service request taking/management terminal 100 and sent through the service request taking/management terminal 100.

FIGS. 2 through 5 are views for explaining a hotel room service request information transfer method according to an exemplary embodiment of the present invention.

FIGS. 2 and 3 are views for explaining a method for receiving information about the current locations of staff members in real time by locating them using wireless routers installed in the hotel, according to an exemplary embodiment of the present invention.

In the present invention, first of all, MAC addresses, signal strengths, etc., which are Wi-Fi AP information of a number of wireless routers installed in the hotel, are collected, and the collected MAC addresses are stored as Wi-Fi AP location information, with identification information including location-specific numbers inputted to it. Afterwards, if a staff member is located near any Wi-Fi AP included in the stored Wi-Fi AP location information, the current location of the staff member is calculated by putting together the strength of the Wi-Fi AP near the staff terminal 300.

Referring to FIG. 2, in the present invention, Wi-Fi addresses are collected, Wi-Fi AP location information is collected, and identification information including location-specific numbers is stored, with the location information inputted into it.

Referring to FIG. 3, in the present invention, if a staff member is located near any Wi-Fi AP included in the Wi-Fi AP location information stored as illustrated in FIG. 2, the current location, i.e., location-specific number, of the staff member may be found by putting together the strength of the Wi-Fi AP near the staff terminal 300 of the staff member.

Once the location-specific numbers of the staff are found, a created room service message may be sent to the staff member closest to where the message is created, thereby enabling the staff to work efficiently.

Referring to FIG. 4, in the present invention, a separate interface may be configured on a terminal in order to allow a staff member to control room service messages. when a staff terminal 300 receives a room service request, the staff member may click an "accept" or "reject" button. If the staff member has clicked the accept button and is processing the room service request or has completed it, the staff member carrying the staff terminal 300 may click an "in-process" button or "completed" button regarding a room service message displayed on the screen of the terminal. If a staff member receives the room service message but clicks the message reject button because they are not able to process the request or is busy working on what they are doing, the room service message may be handed over to other staff members under control of the service request taking/management terminal 100. Once the room service message is handed over from the staff terminal 300, the control value may be sent to the service request taking/management terminal 100 through the cloud service server 400. The service request taking/management terminal 100 may then update the status information of the room service request and send it to every staff terminal 300 through the cloud service server 400 to display the status information of every staff terminal 300.

Figure 5:
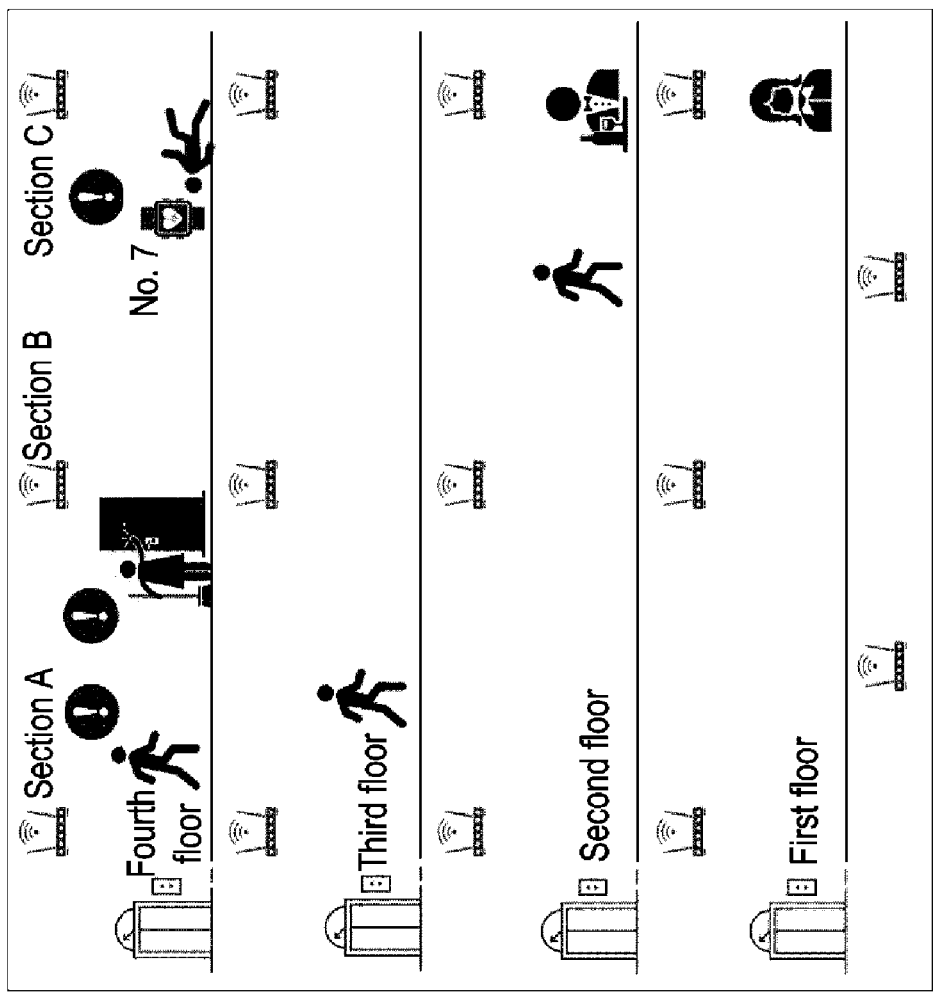

Referring to FIG. 5, in the present invention, if the staff terminal 300 is a smart device capable of detecting an abnormal biological signal, danger, etc., it may create and send an urgent message to other staff terminals 300. For example, if a biological signal from a staff member carrying a staff terminal 300 with serial No. 7 is beyond a certain reference level, an abnormal signal message may be sent to the terminal 300 of that staff member. If this staff member has not read the message for more than a certain amount of time, an urgent message may be created and sent to the staff terminal 300 of the staff member closest to the staff terminal 300 with serial No. 7 or to the staff terminals 300 of all staff members. Also, when the urgent situation is over, the staff member carrying the staff terminal 300 with serial No. 7 or any staff member who has received the urgent message may send an "urgent situation over" message through their own staff terminal 300.

Figure 6:
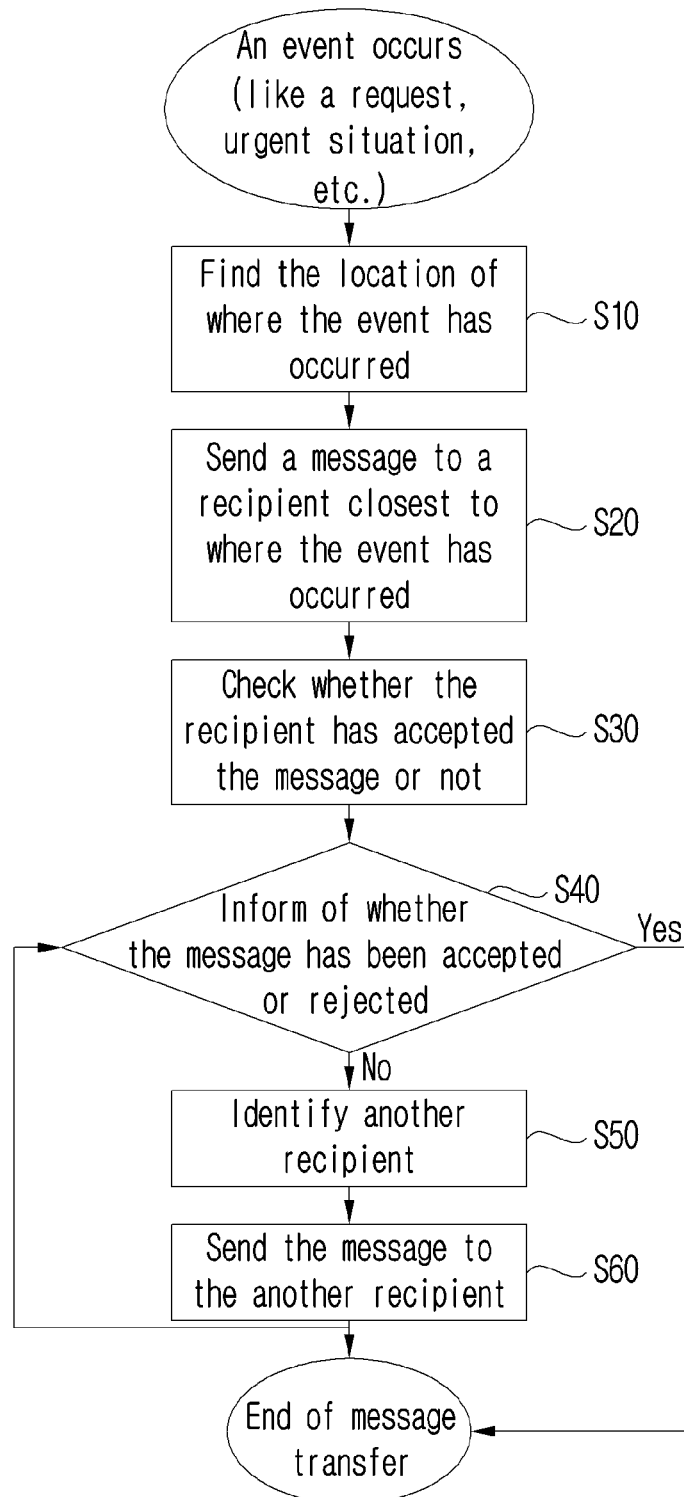
FIG. 6 is a flowchart showing a method for transferring request information in a request information transfer system according to an exemplary embodiment of the present invention.

FIG. 6 is a flowchart showing a method for transferring request information in a request information transfer system according to an exemplary embodiment of the present invention.

First of all, when a particular event occurs, like a room service request or an urgent situation, the service request taking/management terminal 100 finds the location of the staff member closest to where the event has occurred, by putting together and calculating the strength of a Wi-Fi AP near the staff terminal 300 of the closest staff member (S10).

In this case, the step S10 may include: collecting MAC addresses and signal strengths, which are Wi-Fi AP information of a number of wireless routers installed in the hotel and storing the collected MAC addresses as Wi-Fi AP information, with identification information including location-specific numbers inputted into it; and, if a staff member is located near any Wi-Fi AP included in the stored Wi-Fi AP location information, calculating the current location of the staff member by putting together the strength of the Wi-Fi AP near the staff terminal the staff member is carrying, and storing the same as a location-specific number. In this way, the staff member closest to the location of a room from which a room service request is received may be identified.

Once the staff member closest to the location of an event is identified, the service request taking/management terminal 100 sends a room service message or urgent message to the staff terminal 300 of the closest staff member (S20).

Next, the service request taking/management terminal 100 checks whether the staff member has accepted the room service message or urgent message after receiving it (S30).

If the staff member has accepted the room service message or urgent message through the staff terminal 300 (S40), the service request taking/management terminal 100 may update the status information of the staff terminal 300 as, for example, in process, completed, etc., and end the transfer of the message.

If the staff member has rejected the room service message or urgent message (S40), the service request taking/management terminal 100 identifies another recipient—that is, the staff member who is second closest to the location of the particular event and can receive the message, other than the staff member who has rejected the message. In this case, the status of the second closest staff member may be detected based on the status information of the staff terminal 300 (S50).

Once another staff member who can receive the message is detected in the above step by the service request taking/ management terminal 100, the room service message or urgent message is sent to the staff terminal 300 of the another staff member (S60). If this staff member accepts the message, the service request taking/management terminal 100 updates the status information of the corresponding staff terminal 300 and ends the transfer of the message. If the staff member rejects the message, the flow may return to the step S40 of informing of whether the staff member accepts or rejects the message, and repeat the step S50 of detecting another staff member who can receive the message.

In the present invention, it is obvious that all data sent and received between the service request taking/management terminal 100 and the staff terminal 300 may be provided via the cloud service server 400.

In the above description, although all components constituting the embodiments of the present invention have been described as being combined into a single body or as being combined into and operated as a single body, the present invention is not necessarily limited by these embodiments. That is, one or more of all the components may be selectively combined and operated within the scope of the object of the present invention. The above-description is merely intended to illustratively describe the technical spirit of the present invention, and various changes and modifications can be made by those skilled in the art without departing from the essential features of the present invention. The scope of the present invention should be defined by the accompanying claims and all technical spirits falling within the equivalent scope thereof should be interpreted as being included in the scope of the present invention.

One advantage of the present invention is to provide service efficiently by taking a customer's request quickly and preventing other staff members from processing the same customer request.

Another advantage of the present invention is that, if a certain staff member has an urgent situation, other staff members who are close to that staff member are informed of the urgency of the situation to handle this situation quickly.

What is claimed is:

1. A service request information transfer system, comprising:
    a customer terminal associated with a customer or a specific area, the customer terminal configured to send a service request to a service server;
    the service server configured to receive the service request from the customer terminal, search a staff who processes the service request, and transmit a service message including a location of the customer terminal and the service request to a staff terminal;
    the staff terminal configured to receive the service message including the location of the customer terminal and the service request from the service server,
    wherein:
    the staff terminal is configured to detect an abnormal biological signal of the staff, output an abnormal signal message in response to detection of the abnormal biological signal of the staff, and check whether activity of the staff responding to the abnormal signal message is detected, and
    the service server is configured to, when no activity of the staff responding to the abnormal signal message is detected by the staff terminal for a predetermined time period, transmit an urgent message to one or more other staff terminals.

2. The service request information transfer system of claim 1, wherein the service server is configured to, when no activity of the staff responding to the abnormal signal message is detected by the staff terminal for the predetermined time period, transmit the urgent message to a first other staff terminal located closest to the staff terminal among the one or more other staff terminals.

3. The service request information transfer system of claim 2, wherein the service server is configured to, when not receiving a response message responding to the urgent message from the first other staff terminal located closest to the staff terminal for a preset time period or when receiving a rejection message from the first other staff terminal located closest to the staff terminal, transmit the urgent message to a second other staff terminal located next closest to the staff terminal.

4. The service request information transfer system of claim 1, wherein the service server is configured to, when no activity of the staff responding to the abnormal signal message is detected by the staff terminal for the predetermined time period, transmit the urgent message to all other staff terminals connected with the service server.

5. The service request information transfer system of claim 1, wherein the one or more other staff terminals are configured to send a message indicating that an urgent situation associated with the urgent message is over to the service server when the urgent situation of the staff is over.

6. A computer-implemented method for operating a customer terminal associated with a customer or a specific area, the customer terminal configured to send a service request to a service server, the service server configured to receive the service request from the customer terminal, search a staff who processes the service request, and transmit a service message including a location of the customer terminal and the service request to a staff terminal, the staff terminal configured to receive the service message including the location of the customer terminal and the service request from the service server, the method comprising:
    by the staff terminal, detecting an abnormal biological signal of the staff, outputting an abnormal signal message in response to detection of the abnormal biological signal of the staff, and checking whether activity of the staff responding to the abnormal signal message is detected; and
    by the service server, when no activity of the staff responding to the abnormal signal message is detected by the staff terminal for a predetermined time period, transmitting an urgent message to one or more other staff terminals connected with the service server.

7. The service request information transfer method of claim 6, wherein, when no activity of the staff responding to the abnormal signal message is detected by the staff terminal for the predetermined time period, the service server transmits the urgent message to a first other staff terminal located closest to the staff terminal among the one or more other staff terminals.

8. The service request information transfer method of claim 7, wherein, when not receiving a response message responding to the urgent message from the first other staff terminal located closest to the staff terminal for a preset time period or when receiving a rejection message from the first other staff terminal located closest to the staff terminal, the service server transmits the urgent message to a second other staff terminal located next closest to the staff terminal.

9. The service request information transfer method of claim 6, wherein, when no activity of the staff responding to the abnormal signal message is detected by the staff terminal for the predetermined time period, the service server transmits the urgent message to all other staff terminals connected with the service server.

10. The service request information transfer method of claim 6, wherein the one or more other staff terminals sends a message indicating that an urgent situation associated with the urgent message is over to the service server when the urgent situation of the staff is over.

* * * * *